United States Patent
Sun et al.

(10) Patent No.: US 12,327,848 B1
(45) Date of Patent: Jun. 10, 2025

(54) PROCESS AND DEVICE FOR RECYCLING WASTE LITHIUM BATTERY MATERIALS

(71) Applicants: Institute of Process Engineering, Chinese Academy of Sciences, Beijing (CN); Beijing Zhongke Brunp Recycling Technology Innovation Co., LTD, Beijing (CN)

(72) Inventors: Zhi Sun, Beijing (CN); Fei Kang, Beijing (CN); Yujuan Zhao, Beijing (CN); Dingshan Ruan, Beijing (CN); Dangwen Zhang, Beijing (CN); Wenyi Yan, Beijing (CN); Tianya Wang, Beijing (CN)

(73) Assignees: Institute of Process Engineering, Chinese Academy of Sciences, Beijing (CN); Beijing Zhongke Brunp Recycling Technology Innovation Co., LTD, Beijing (CN)

( * ) Notice: Subject to any disclaimer, the term of this patent is extended or adjusted under 35 U.S.C. 154(b) by 0 days.

(21) Appl. No.: 18/928,239

(22) Filed: Oct. 28, 2024

(30) Foreign Application Priority Data

Apr. 29, 2024 (CN) .......................... 202410524536.7

(51) Int. Cl.
*H01M 10/00* (2006.01)
*B09B 3/35* (2022.01)
(Continued)

(52) U.S. Cl.
CPC ............... *H01M 10/54* (2013.01); *B09B 3/35* (2022.01); *B09B 2101/16* (2022.01)

(58) Field of Classification Search
CPC .. H01M 10/0525; H01M 10/54; H01M 4/505; H01M 4/525; Y02E 60/10
See application file for complete search history.

(56) References Cited

U.S. PATENT DOCUMENTS

2019/0123402 A1* 4/2019 Wang ................ H01M 10/0525

FOREIGN PATENT DOCUMENTS

| CN | 108615956 A | 10/2018 |
|---|---|---|
| CN | 110600757 A | 12/2019 |

(Continued)

*Primary Examiner* — Anca Eoff
*Assistant Examiner* — Monique M Wills
(74) *Attorney, Agent, or Firm* — Bayramoglu Law Offices LLC

(57) ABSTRACT

A process and a device for recycling waste lithium battery materials are provided. The process includes: S10. charging, transporting composite pole pieces to a flexible de-powdering device through a uniform feeder; S20. flexibly removing powder, rubbing and beating the composite pole pieces using the flexible de-powdering device, after flexible depowdering, discharging part of composite current collectors from a closed air spiral discharge pipe connecting to the flexible de-powdering device; S30. centrally receiving materials, transporting falling electrode powder and remaining composite current collectors to a cyclone collector through negative pressure pipelines, and centrally collecting dust produced in the process of uniform feeding and closed air spiral discharge; and S40. screening, screening and separating the materials collected by the cyclone collector using a vibrating screen, and separating the composite current collectors and electrode powder. The process can improve the separation efficiency of the electrode powder.

7 Claims, 7 Drawing Sheets

(51) Int. Cl.
  *H01M 10/54* (2006.01)
  *B09B 101/16* (2022.01)

(56) References Cited

FOREIGN PATENT DOCUMENTS

| | | |
|---|---|---|
| CN | 110694771 A | 1/2020 |
| CN | 116315220 A | 6/2023 |
| CN | 220092490 U | 11/2023 |
| CN | 117199597 A | 12/2023 |

\* cited by examiner

PROCESS AND DEVICE FOR RECYCLING WASTE LITHIUM BATTERY MATERIALS

CROSS REFERENCE TO THE RELATED APPLICATIONS

This application is based upon and claims priority to Chinese Patent Application No. 202410524536.7, filed on Apr. 29, 2024, the entire contents of which are incorporated herein by reference.

TECHNICAL FIELD

The present disclosure relates to the technical field of environmental protection, and in particular, to a process and a device for recycling waste lithium battery materials.

BACKGROUND

The composite current collector mainly adopts a structural form of aluminum-plastic composite membranes or copper-plastic composite membranes, wherein the inner layer is polypropylene, polyester, polyethylene and other polymer materials, and the outer layer is copper, aluminum and other metal materials. In practical applications, the composite current collector usually uses vacuum evaporation, sputtering and other methods to form a nanoscale metal layer on the surface of polymer materials, then the metal layer is deposited and thickened to more than 1 μm by means of water plating, to improve the performance of the battery. The composite current collector has high energy density and good cycle life, at the same time, it can also provide sufficient overcharge protection, stable high current discharge capacity and excellent safety performance, and it can be widely used in the field of high-performance batteries, such as solar cells and lithium-ion batteries. Compared with the traditional aluminum foil or copper foil, the composite current collector can reduce the cost of the battery and improve the energy density and safety performance of the battery, so it is considered to be one of the best solutions to achieve high energy density batteries.

With the large-scale application of composite current collectors, due to the lightweight of polymer composite pole pieces, they cannot be directly separated using traditional crushing pole pieces equipment. Therefore, how to effectively separate and pretreat the composite pole pieces has become an urgent problem to be solved in the lithium battery recycling industry.

In the prior art, the patent of invention with a publication number of CN116315220A disclosed a recycling process of waste battery electrode powder. The invention used a dry stripping machine to strip and depowder the electrode powder adhered on the surface of copper-aluminum foil piece materials or electrical core pole piece materials before fine grinding and granulation, the copper and aluminum particles after stripping and powder removal could be quickly transferred to the first-level classification warehouse, the exfoliated polar powder can be quickly transferred to the second-level classification warehouse, To achieve rapid separation of copper and aluminum and powder, which can reduce the fine powder of copper and aluminum as much as possible to complete the depowdering process, so as to prevent the repeated friction between the shedding powder and the copper and aluminum in the stripping bin, and also prevent the further fine powder of copper and aluminum, which is conducive to improving the purity of the powder. However, the recovery process of the electrode powder is long and the energy consumption is high, which is only suitable for the pole piece with copper and aluminum foil as the matrix. Due to the low viscosity between the electrode powder coating and the current collector of the composite pole pieces and the light weight of the current collector materials, it is not suitable for multi-stage crushing by this method.

The patent of invention with a publication number of CN110694771A disclosed a flexible airflow powder removal method for waste ternary lithium batteries. The main steps of this method included: putting the waste ternary lithium batteries into a battery shredder for preliminary shredding, performing dust collection treatment on volatile gases, after the batteries are shredded, transporting shredded batteries to a wind separation vibration machine for preliminary powder separation and diaphragm wind selection, transferring wind-selected diaphragms to a diaphragm silo, then the selected powder into a material powder silo, selected crushing material is first subjected to magnetic separation and then enters a secondary crusher to perform fine crushing, finally, entering an airflow powder remover for flexible powder removal treatment, and separating copper-aluminum foils and secondary crushing powder, and then transporting the secondary powder to the material powder silo. The invention did not need to crush and grind the battery pole piece three times, avoided the problem of powder entrainment caused by the battery pole piece coiling, and could flexibly adjust the airflow powder removal speed and improve the powder removal efficiency of the batteries. However, the method of flexible powder removal by airflow is inefficient, needs to cooperate with two crushing processes and has high requirements for the particle size of the product after the second crushing.

SUMMARY

In order to achieve the above effects, the present disclosure adopts the following technical solutions.

A process for recycling waste lithium battery materials includes:

S10. charging transporting composite pole pieces to a flexible de-powdering device through a uniform feeder, wherein shredding the composite pole pieces by a shredder;

S20. flexibly removing powder rubbing and beating the composite pole pieces using the flexible de-powdering device, after flexible depowdering, discharging part of composite current collectors from a closed air spiral discharge pipe connecting to the flexible de-powdering device;

S30. centrally receiving materials transporting falling electrode powder and remaining composite current collectors to a cyclone collector through negative pressure pipelines, centrally collecting dust produced in the process of uniform feeding and closed air spiral discharge; and wherein arranging a wind riddle at the lower end of the flexible de-powdering device, which is connected to the negative pressure pipelines, to discharge weights doped in the pole pieces; and S40. screening screening and separating the materials collected by the cyclone collector using a vibrating screen, and separating the composite current collectors and electrode powder.

Further, the process further includes a step:

S50. pulse dust removal filtering dust particles doped in the air during the aggregate process using a pulse dust collector, to prevent environmental pollution and waste of resources.

Further, in step S10, the composite pole pieces shredded by the shredder should be less than 5 cm×5 cm.

Further, in step S20, in the flexible de-powdering device, rubbing and beating the composite pole pieces using soft rubber rods.

Further, in step S40, a sieve mesh of the vibrating screen is 60 mesh-200 mesh.

Further, when processing composite pole pieces without heating treatment, a screen mesh of the vibrating screen is 60 mesh-100 mesh; and when processing heat-treated composite pole pieces, a screen mesh of the vibrating screen is 120 mesh-180 mesh.

A device for recycling waste lithium battery materials, which is configured to achieve any of the above-mentioned process for recycling waste lithium battery materials, and the device for recycling waste lithium battery materials includes:
- a flexible de-powdering device, the upper end of the flexible de-powdering device is provided with negative pressure powder collection ports, a discharge port of the flexible de-powdering device is provided with a closed air discharge screw machine, and the upper end of the closed air discharge screw machine is provided with a dust outlet;
- a uniform feeder, the uniform feeder is located at the upper end of the flexible de-powdering device, and is connected to the flexible de-powdering device, to uniformly feed the composite pole pieces into the flexible de-powdering device for powder removal; and the upper end of the uniform feeder is provided with a dust exhaust port;
- a cyclone collector, an inlet of the cyclone collector is connected to negative pressure pipelines, and the negative pressure pipelines are connected to the dust exhaust port, the dust outlet and negative pressure powder collection ports, respectively;
- a wind riddle, the wind riddle is arranged at the lower end of the flexible de-powdering device; and an outlet of the wind riddle is connected to the negative pressure pipelines; and
- a discharge port of the cyclone collector is connected to a vibrating screen, and the vibrating screen separates the composite current collector output by the closed air discharge screw machine from the electrode powder.

Further, the device further includes a pulse dust collector, which is arranged at the upper end of the cyclone collector and connected to the cyclone collector;
- an induced draft fan connected to the pulse dust collector;
- wherein, the induced draft fan introduces dust-containing gas into the pulse dust collector, and uses a pulse injection device of the pulse dust collector to remove the dust-containing gas to discharge the purified gas into the atmosphere.

The beneficial effects are:
the present disclosure uses a flexible de-powdering device with soft rubber rods to separate the composite pole pieces, which can improve the separation efficiency of the electrode powder while avoiding the excessive shedding of the metal coating on the composite current collectors, a recovery rate of the electrode powder after flexible powder removal is >98%, and a purity is >99%.

The flexible de-powdering device provided by the present disclosure uses circulating air for negative pressure transportation throughout the process, and the dust generated during the separation process can not enter the air, thus avoiding dust pollution.

In addition, the present disclosure does not require heat treatment and a multi-stage crushing process and has the advantages of a simple process, low cost and large output.

wherein, 1. flexible de-powdering device; 2. negative pressure powder collection port; 3. induced draft fan; 4. uniform feeder; 5. pulse dust collector; 6. cyclone collector; 7. negative pressure pipeline; 8. vibrating screen; 9. first composite current collector outlet; 10. electrode powder export; 11. second composite current collector outlet; 12. closed air discharge screw machine; and 13. wind riddle.

DETAILED DESCRIPTION OF THE EMBODIMENTS

Embodiment 1

Figure 1:
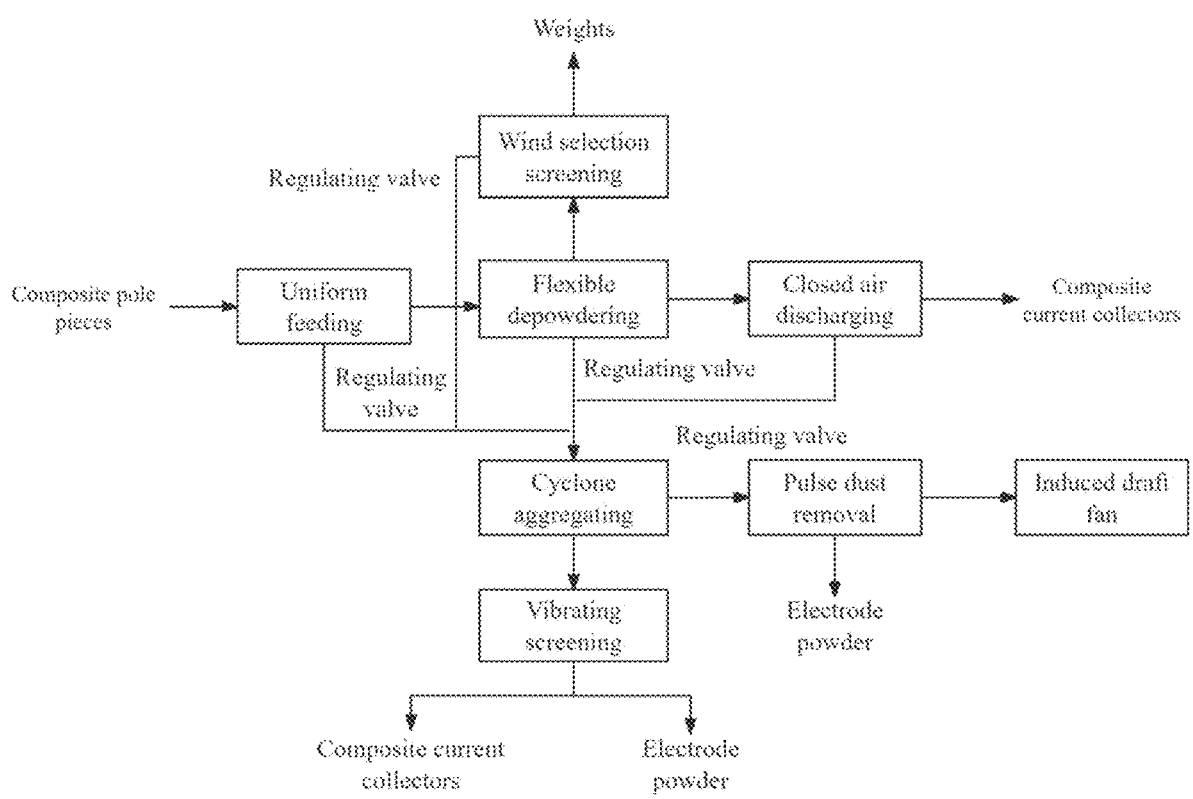
FIG. 1 is a flow chart of a process for recycling waste lithium battery materials.
Figure 2:
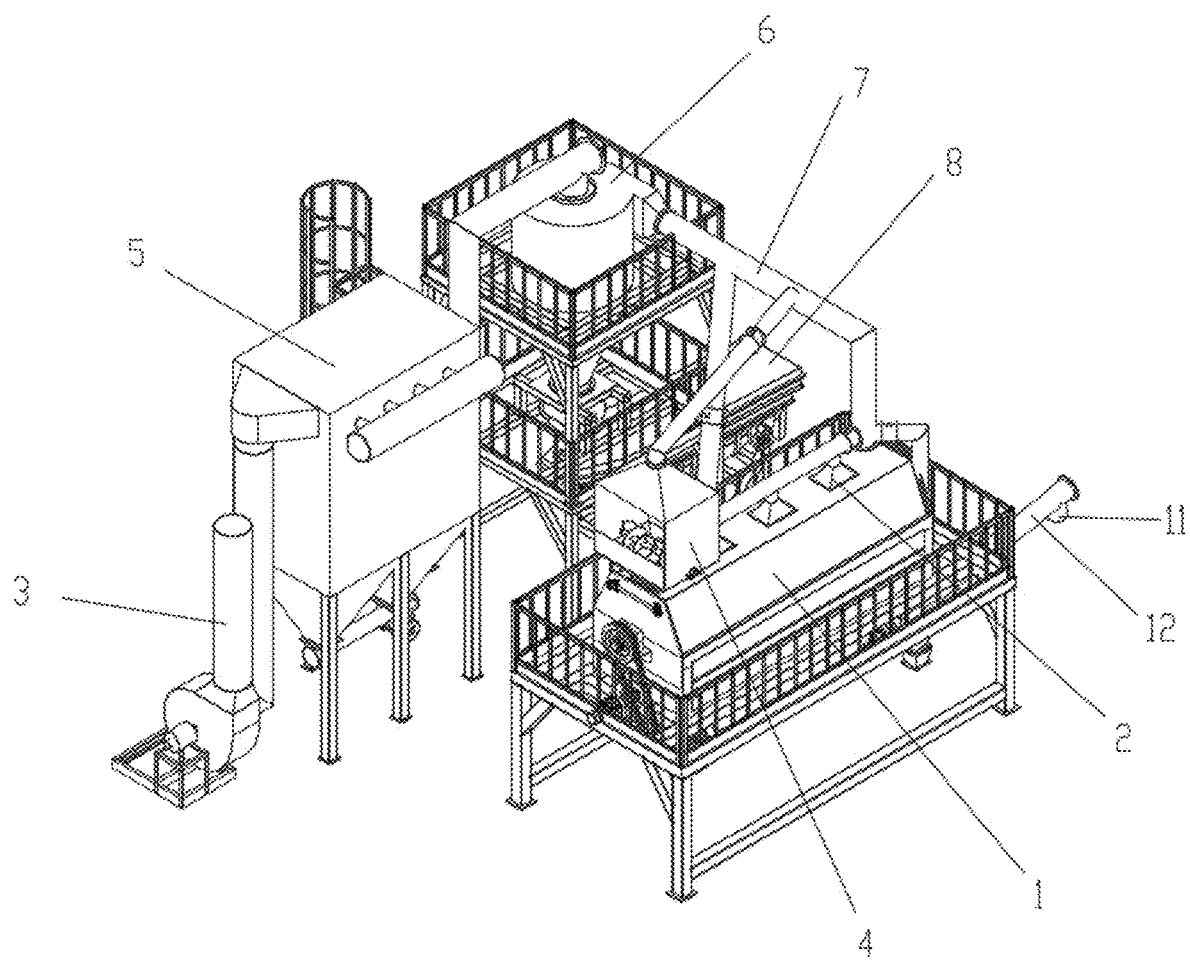
FIG. 2 is a structure diagram of a device for recycling waste lithium battery materials.
Figure 3:
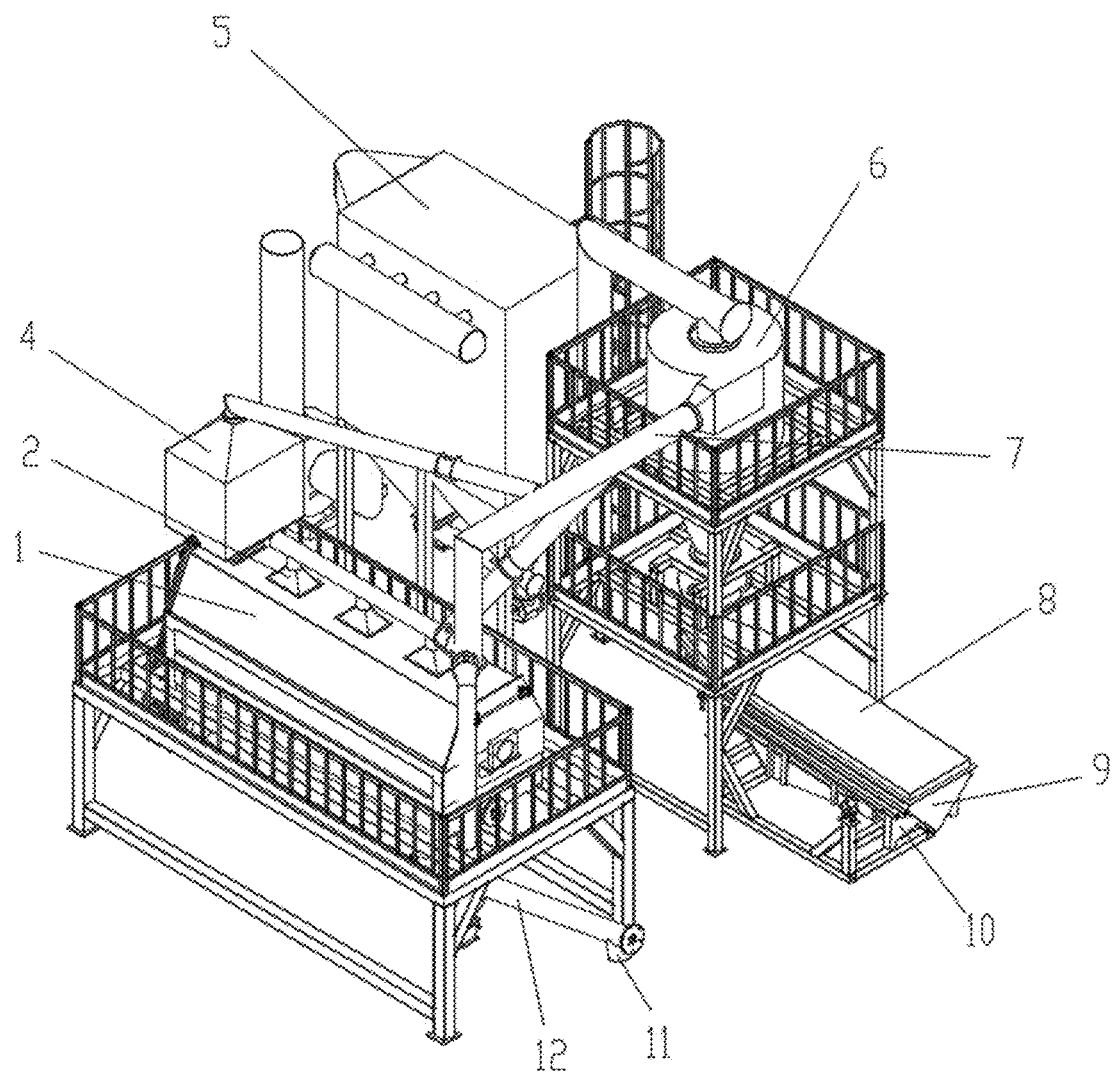
FIG. 3 is another perspective diagram of a device for recycling waste lithium battery materials.
Figure 4:
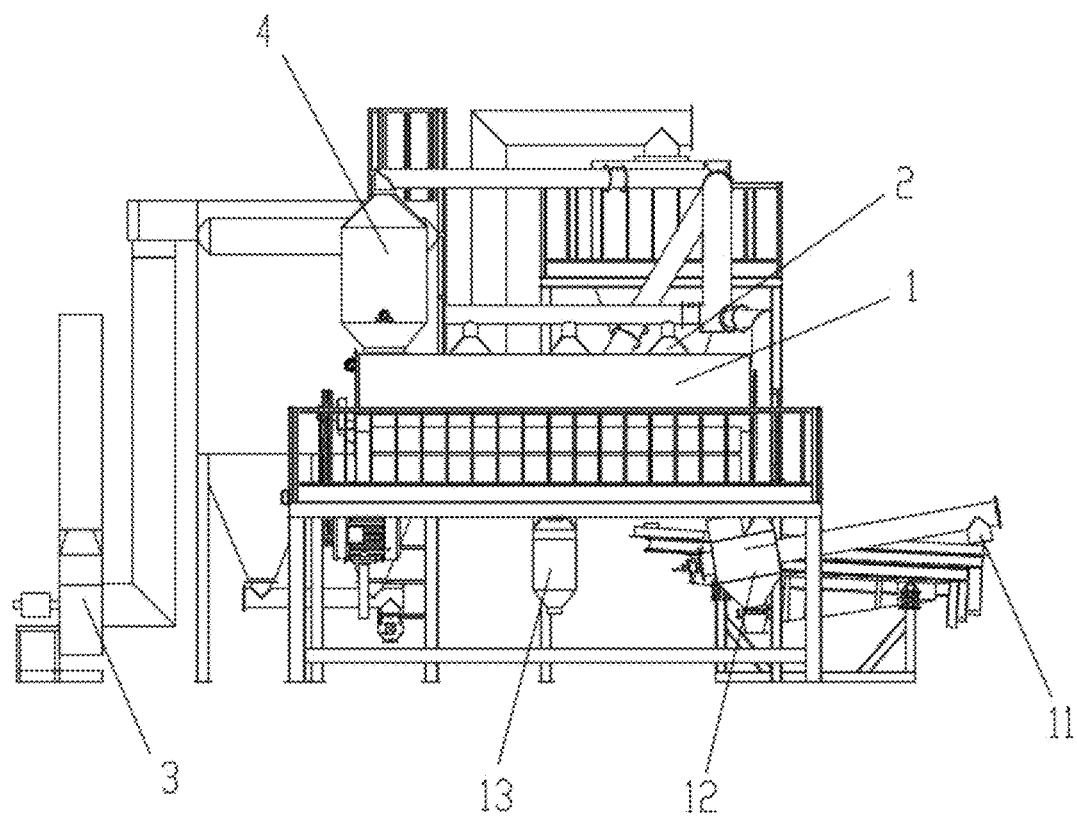
FIG. 4 is a front view of a device for recycling waste lithium battery materials.
Figure 5:
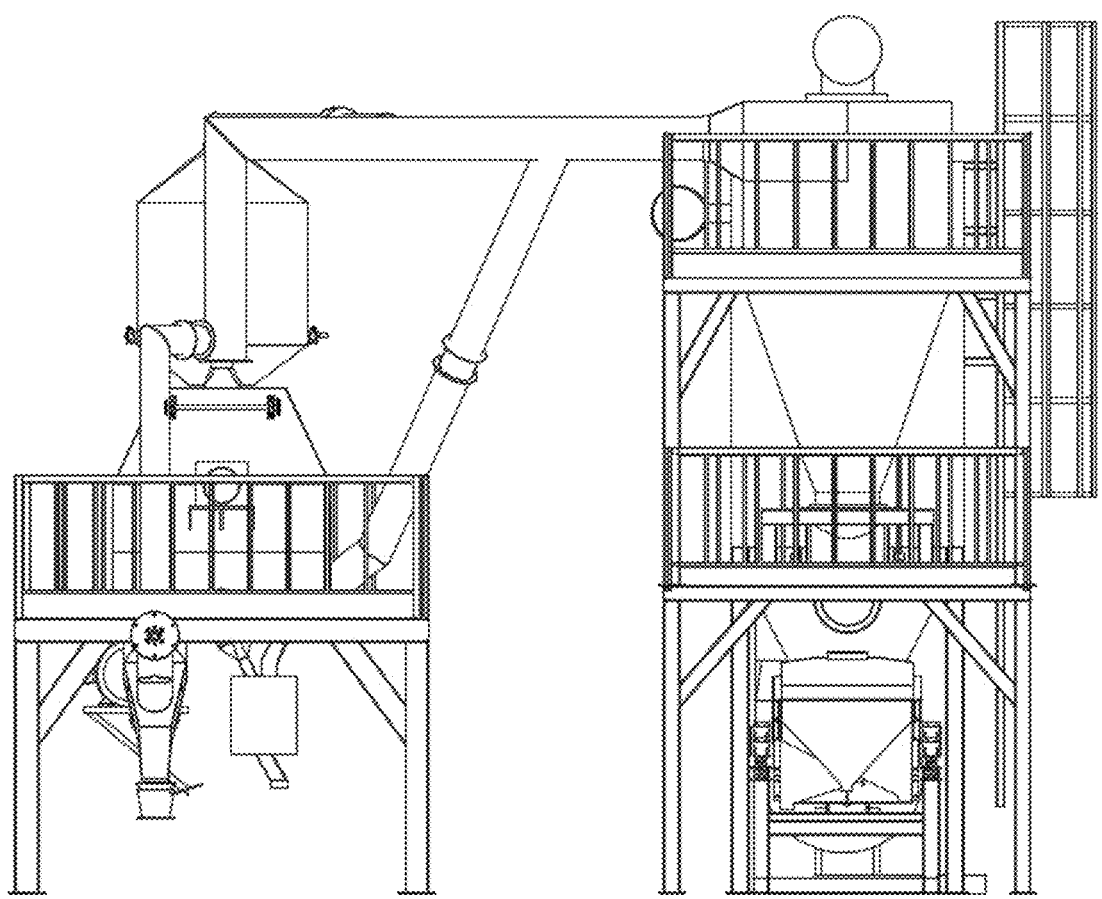
FIG. 5 is a right view of a device for recycling waste lithium battery materials.
Figure 6:
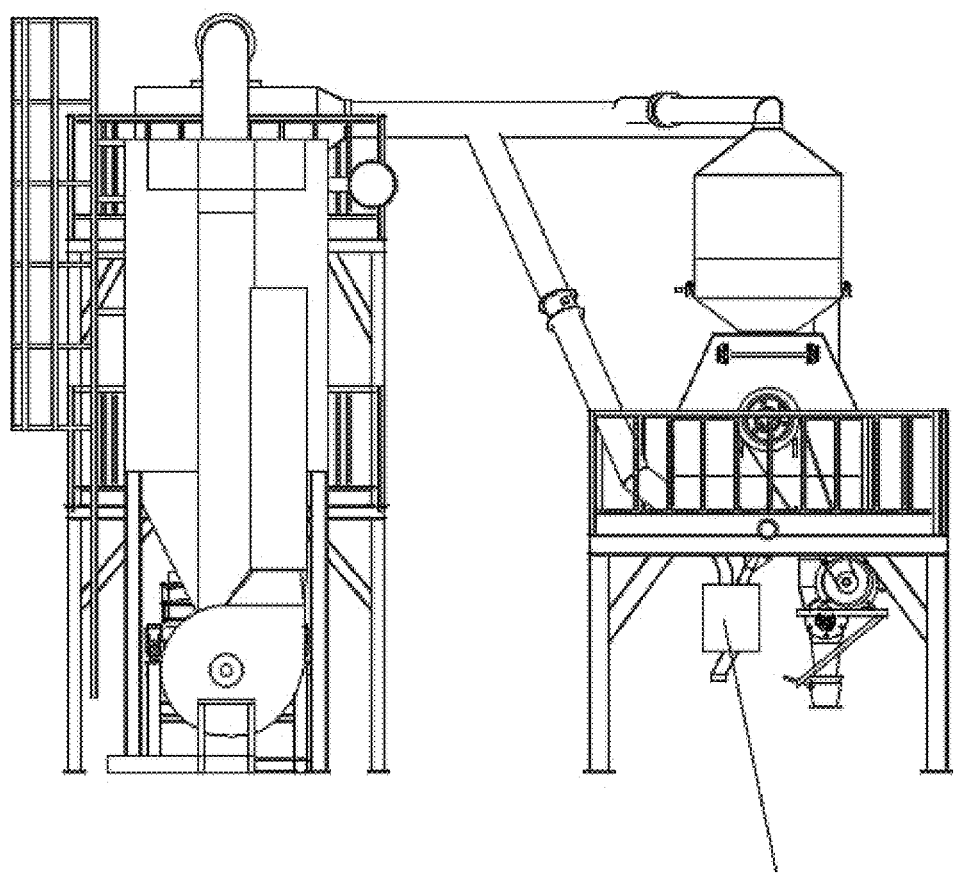
FIG. 6 is a left view of a device for recycling waste lithium battery materials.
Figure 7:
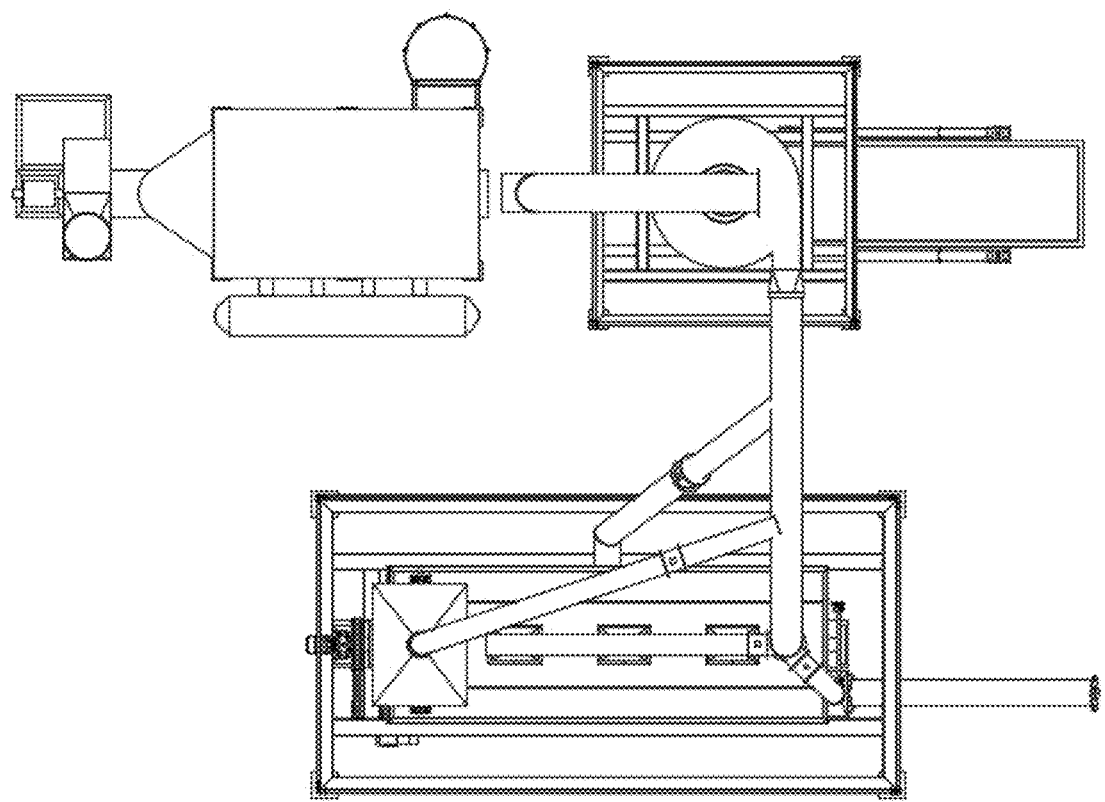
FIG. 7 is a top view of a device for recycling waste lithium battery materials.

Referring to FIG. 1, a process for recycling waste lithium battery materials includes the following steps:

S10. Charging

Transporting composite pole pieces to a flexible de-powdering device through a uniform feeder, wherein shredding the composite pole pieces by a shredder; and
wherein the composite pole pieces torn by the shredder should be less than 5 cm×5 cm.

S20. Flexibly Removing Powder

Rubbing and beating the composite pole pieces using the flexible de-powdering device, wherein, in the flexible de-powdering device, rubbing and beating the composite pole pieces using soft rubber rods.

After flexible depowdering, discharging part of composite current collectors from a closed air spiral discharge pipe connecting to the flexible de-powdering device.

Wherein, a principle of the flexible powder removal equipment is to use the flexible rubber rods to rub and beat the pole pieces softly, thereby reducing the repeated friction of the composite current collectors, and obtained composite current collectors are all larger flakes, which also prevents the further peeling of the metal coating of the composite current collectors and is beneficial to improve the purity of the electrode powder.

S30. Centrally Receiving Materials

Transporting falling electrode powder and remaining composite current collectors to a cyclone collector through negative pressure pipelines, centrally collecting dust produced in the process of uniform feeding and closed air spiral discharge; and wherein a wind riddle is arranged at the lower end of the flexible de-powdering device and is connected to the negative pressure pipelines, to discharge weights doped in the pole pieces; and S40. Screening Screening and separating the materials collected by the cyclone collector using a vibrating screen, and separating the composite current collectors and electrode powder.

Wherein, a sieve mesh of the vibrating screen is 60 mesh-200 mesh, and composite aluminum current collectors and ternary positive electrode powder are separated.

In the present embodiment, the composite pole pieces without heat treatment are treated, and a sieve mesh of the vibrating screen is 60 mesh-100 mesh.

S50. Pulse Dust Removal

Filtering dust particles doped in the air using during the aggregate process a pulse dust collector, to prevent environmental pollution and waste of resources.

After the above flexible powder removal process, a recovery rate of the ternary positive electrode powder of the waste lithium ion composite pole pieces is 98.7%, and a purity is 99.2%.

Embodiment 2

The flexible powder removal process of the present embodiment is the same as that of Embodiment 1, except that in the present embodiment:
the treated composite pole pieces are composite positive pole pieces after heat treatment, a sieve mesh is 120-180 mesh; and after the above flexible powder removal process, a recovery rate of the ternary positive electrode powder is 99.4%, and a purity is 99.1%.

Embodiment 3

Referring to FIGS. 2-7, a device for recycling waste lithium battery materials, which is configured to achieve the process for recycling waste lithium battery materials provided by Embodiment 1 or Embodiment 2, and the device for recycling waste lithium battery materials includes:
a flexible de-powdering device 1, the upper end of the flexible de-powdering device 1 is provided with negative pressure powder collection ports 2, a discharge port of the flexible de-powdering device 1 is provided with a closed air discharge screw machine 12, and the upper end of the closed air discharge screw machine 12 is provided with a dust outlet;
a uniform feeder 4, the uniform feeder 4 is located at the upper end of the flexible de-powdering device 1 and is connected to the flexible de-powdering device 1, to uniformly feed the composite pole pieces into the flexible de-powdering device 1 for powder removal; and the upper end of the uniform feeder 4 is provided with a dust exhaust port;
a cyclone collector 6, an inlet of the cyclone collector 6 is connected to negative pressure pipelines 7, and the negative pressure pipelines 7 are connected to the dust exhaust port, the dust outlet and negative pressure powder collection ports 2, respectively;
a wind riddle 13, the wind riddle 13 is arranged at the lower end of the flexible de-powdering device 1; an outlet of the wind riddle 13 is connected to the negative pressure pipelines 7; and
a discharge port of the cyclone collector 6 is connected to a vibrating screen 8, and the vibrating screen 8 separates the composite current collector output by the closed air discharge screw machine 12 from the electrode powder.

Wherein, the vibrating screen 8 is arranged with a first composite current collector outlet 9 and an electrode powder export 10, which are configured to discharge separated composite current collectors and powder and the electrode powder.

In the present embodiment, the upper end of the flexible de-powdering device 1 is equipped with three negative pressure powder collection ports 2, three negative pressure powder collection ports 2 are connected to dusting wind pipelines, and the dusting wind pipelines are connected to the negative pressure pipelines 7.

Specifically, an export of the wind riddle 13 is provided with a first connecting pipe, and the first connecting pipe is connected to the negative pressure pipelines 7; the dust exhaust port at the upper end of the uniform feeder 4 is connected to a second connecting pipe, and the second connecting pipe is connected to the negative pressure pipelines 7; the dust outlet at the upper end of the closed air discharge screw machine 12 is provided with a third connecting pipe, and the third connecting pipe is connected to the negative pressure pipelines 7, wherein, a connection between the first connecting pipe and the negative pressure pipelines 7 is located on the side near the cyclone collector 6.

In the present embodiment, a ventilation pipe, the first connecting pipe, the second connecting pipe, the third connecting pipe and the negative pressure pipelines 7 are respectively equipped with a first regulating valve, a second regulating valve, a third regulating valve, a fourth regulating valve and a fifth regulating valve, and the purpose is to ensure the stable input and discharge of materials by using air pressure.

Specifically, an inlet of the cyclone collector 6 is connected to the negative pressure powder collection port 2 through the negative pressure pipelines 7, and the purpose is to collect the falling electrode powder, at the same time, lighter composite current collectors may also enter the cyclone collector 6 through the negative pressure pipelines 7 with the electrode powder.

The closed air discharge screw machine 12 is arranged, and the closed air discharge screw machine 12 is arranged with a second composite collector outlet 11, and the purpose is to ensure smooth discharge of the heavier composite current collectors.

In the present embodiment, the device for recycling waste lithium battery materials further includes a pulse dust collector 5 which is set at the upper end of the cyclone collector 6 and connected with the cyclone collector 6;
an induced draft fan 3 connected with pulse dust collector 5;
wherein, the induced draft fan 3 introduces dust-containing gas into the pulse dust collector 5, and uses a pulse injection device of the pulse dust collector 5 to remove the dust-containing gas to discharge the purified gas into the atmosphere.

The above descriptions are only better embodiments of the present disclosure, not any restriction on the technical scope of the present disclosure. Therefore, any slight modification, equivalent change and modification of the above implementation cases according to the technical essence of the invention still belong to the scope of the technical scheme of the present disclosure.

What is claimed is:

1. A process for recycling waste lithium battery materials, comprising:

s10, charging transporting composite pole pieces to a flexible de-powdering device through a uniform feeder, wherein the composite pole pieces are shredded by a shredder;

s20, flexibly removing powder rubbing and beating the composite pole pieces using the flexible de-powdering device, after flexible depowdering, discharging a part of composite current collectors from a closed air spiral discharge pipe connecting to the flexible de-powdering device;

s30, centrally receiving materials transporting falling electrode powder and remaining composite current collectors to a cyclone collector through negative pressure pipelines, centrally collecting dust produced in a process of uniform feeding and closed air spiral discharge; wherein a wind riddle is arranged at a lower end of the flexible de-powdering device and is connected to the negative pressure pipelines to discharge weights doped in the composite pole pieces; and s40, screening screening and separating the materials collected by the cyclone collector using a vibrating screen, and separating the remaining composite current collectors and the falling electrode powder;

wherein, a device for recycling the waste lithium battery materials is configured to achieve the process for recycling the waste lithium battery materials, and the device for recycling the waste lithium battery materials comprises:

the flexible de-powdering device, wherein an upper end of the flexible de-powdering device is provided with negative pressure powder collection ports, a discharge port of the flexible de-powdering device is provided with a closed air discharge screw machine, and an upper end of the closed air discharge screw machine is provided with a dust outlet;

the uniform feeder, wherein the uniform feeder is located at the upper end of the flexible de-powdering device and is connected to the flexible de-powdering device to uniformly feed the composite pole pieces into the flexible de-powdering device for powder removal; and an upper end of the uniform feeder is provided with a dust exhaust port;

the cyclone collector, wherein an inlet of the cyclone collector is connected to the negative pressure pipelines, and the negative pressure pipelines are connected to the dust exhaust port, the dust outlet, and the negative pressure powder collection ports, respectively; and the wind riddle, wherein the wind riddle is arranged at the lower end of the flexible de-powdering device; and an outlet of the wind riddle is connected to the negative pressure pipelines;

wherein a discharge port of the cyclone collector is connected to the vibrating screen, and the vibrating screen separates the remaining composite current collectors output by the closed air discharge screw machine from the falling electrode powder.

2. The process for recycling the waste lithium battery materials according to claim 1, further comprising:

s50, pulse dust removal filtering dust particles doped in air during an aggregate process using a pulse dust collector, to prevent an environmental pollution and a waste of resources.

3. The process for recycling the waste lithium battery materials according to claim 1, wherein in the step s10, the composite pole pieces shredded by the shredder are less than 5 cm×5 cm.

4. The process for recycling the waste lithium battery materials according to claim 1, wherein in the step s20, in the flexible de-powdering device, the composite pole pieces are rubbed and beaten using soft rubber rods.

5. The process for recycling the waste lithium battery materials according to claim 1, wherein in the step s40, a sieve mesh of the vibrating screen is 60 mesh-200 mesh.

6. The process for recycling the waste lithium battery materials according to claim 5, wherein when processing the composite pole pieces without a heating treatment, a sieve mesh of the vibrating screen is 60 mesh-100 mesh; and when processing heat-treated composite pole pieces, a sieve mesh of the vibrating screen is 120 mesh-180 mesh.

7. The process for recycling the waste lithium battery materials according to claim 1, wherein the device further comprises:

a pulse dust collector, wherein the pulse dust collector is arranged at an upper end of the cyclone collector and is connected to the cyclone collector; and an induced draft fan connected to the pulse dust collector;

wherein, the induced draft fan introduces a dust-containing gas into the pulse dust collector, and uses a pulse injection device of the pulse dust collector to remove the dust-containing gas to discharge a purified gas into an atmosphere.

* * * * *